May 28, 1968  L. C. KNOX ET AL  3,385,370
SELF-FILL AND FLOW CONTROL SAFETY VALVE
Filed June 29, 1966  2 Sheets-Sheet 1

INVENTORS
LLOYD CARTER KNOX
JOHN W. WOODS
BY Burns, Doane, Benedict, Swecker & Mathis
ATTORNEYS

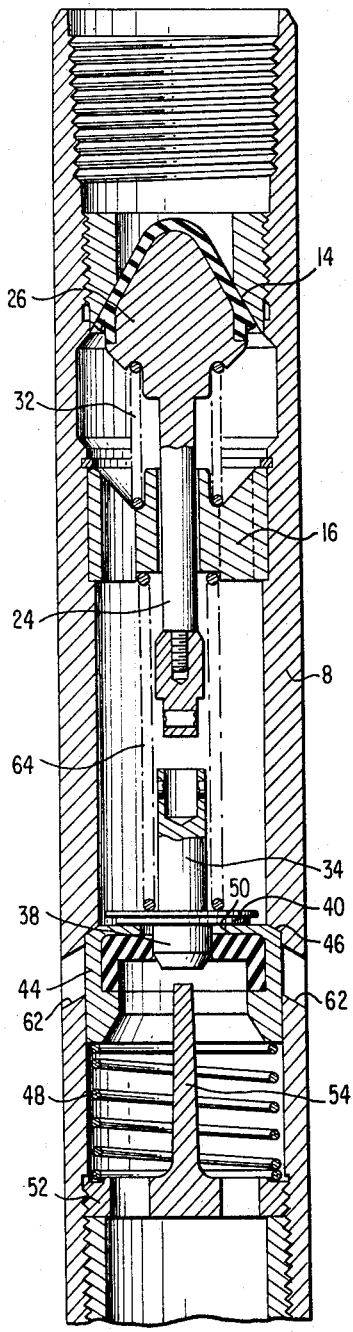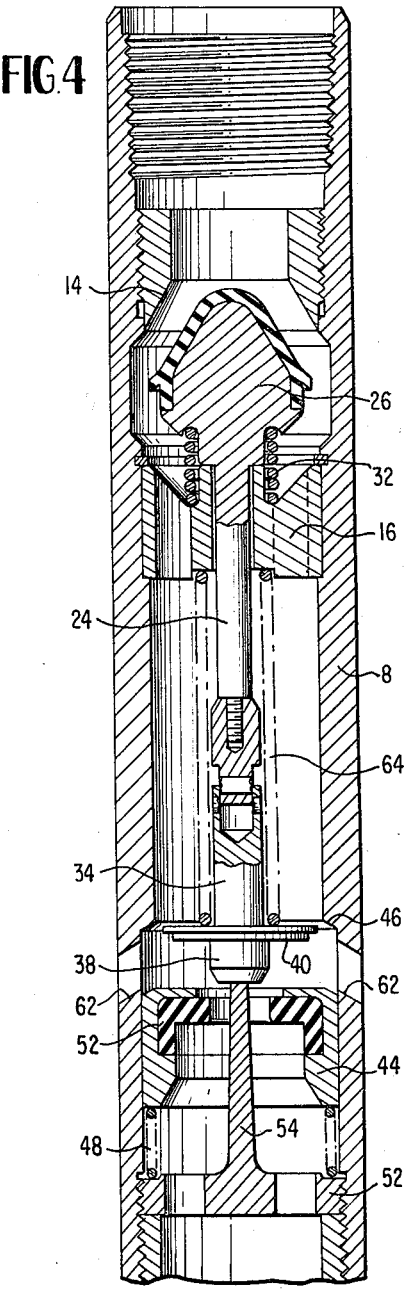
INVENTORS
LLOYD CARTER KNOX
JOHN W. WOODS
ATTORNEYS

United States Patent Office 3,385,370
Patented May 28, 1968

3,385,370
SELF-FILL AND FLOW CONTROL
SAFETY VALVE
Lloyd Carter Knox and John W. Woods, Duncan, Okla.,
assignors to Halliburton Company, Duncan, Okla., a
corporation of Delaware
Filed June 29, 1966, Ser. No. 561,588
12 Claims. (Cl. 166—225)

ABSTRACT OF THE DISCLOSURE

Valve apparatus for controlling the flow of fluid into a casing string as the string is being lowered in a well, and including a valve for controlling fluid flow during cementing operations. The valve apparatus is positioned adjacent the lower end of a pipe string and includes a tubular body having a downwardly facing valve seat. A valve element is mounted in the body and biased upwardly for movement into engagement with the valve seat. The tubular body has a plurality of radial ports that are closed by the valve element when it is in engagement with the valve seat. The valve element has a central port that is closed by a second valve element. Above the first valve element there is an upper valve seat and a third valve that is movable upwardly into engagement with the upper valve seat. The second and third valve elements are biased upwardly and downwardly, respectively, but are connected together by a frangible link. While the casing string is being lowered in the bore hole the valve remains closed until a predetermined pressure differential builds up on the outside of the valve. The valve then opens and fluid flows into the casing. If the rate of fluid flow into the casing exceeds a predetermined rate, the third valve element closes against the upper valve seat. The valve assembly is converted to a float valve by pumping fluid down the casing string at a high rate to break the frangible link.

---

This invention relates to well apparatus for controlling the flow of fluid through a pipe, and more particularly to apparatus for controlling the flow of fluid into a casing string as it is being run into a bore hole and for controlling the flow of fluid during cementing and similar operations.

After a bore hole has been drilled, the hole may be cased to prevent it from caving in. In accordance with common practice, a string of pipe is run in the bore hole and cement is pumped down the pipe. The cement flows out of the bottom of the pipe and upwardly through the annular space between the outside of the pipe and the wall of the bore hole. When the cement hardens, the casing string is firmly secured in the well bore and further well operations may be carried out without the bore hole caving in.

In lowering the casing string, it is desirable to gradually fill the pipe with fluid to reduce the pressure differential between the interior and exterior of the pipe. There should be a slight differential in pressure, however, to keep the fluid in the pipe from overflowing at the top of the casing string, since the mud and water would spill on the crew and on the rig floor. A pressure differential of about 90 to 100 pounds per square inch pressure between the interior and the exterior of the casing string would normally prevent fluid in the casing string from overflowing.

As the casing string is being lowered in the well bore, there is always the possibility of the well starting to come in. If this happens, the formation pressure may force the fluid into the pipe at the bottom of the casing string at such a rapid rate that the fluid would blow out at the top of the casing string. This can be prevented by shutting off the flow of fluid into the bottom of the pipe and applying pressure to overcome the formation pressure.

During the cementing operation, cement is pumped down the casing string and out at the bottom of the pipe. When the cement has been placed in the annular space between the outside of the casing pipe and the wall of the well bore in this manner, the hydrostatic pressure of the cement tends to cause the cement to flow back into the casing string. Therefore, it is necessary to provide a back pressure valve to resist the hydrostatic pressure at the bottom of the casing string. The back pressure valve must open in response to fluid pressure in the pipe being greater than the fluid pressure on the outside of the pipe to allow the cement to pass out of the bottom of the pipe. Thus, the back pressure valve operates as a check valve.

The self-fill valve for filling the casing string while it is being run in the bore hole opens under just the opposite fluid pressure conditions. Thus, several valves which are seemingly incompatible are required in carrying out casing placement and cementing, and related operations. One conventional method of controlling the flow in a well casing is to use plugs or balls which are dropped in the casing string to trip a valve or to render it inoperative. Of course, if plugs or balls are used, it is necessary to have a clear passage through the entire casing string to permit the plugs or balls to pass down to the position of the valve, near the bottom of the casing string. If intermediate tools are inserted in the casing string, such as multiple stage cementing collars or packers, then the use of plugs or balls to operate valves below the level of these tools may be awkward or impossible.

Accordingly, it is an object of this invention to provide a self-fill collar or shoe that incorporates a flow control safety valve.

It is a further object of this invention to provide flow control apparatus which is operated by fluid pressure rather than by plugs or balls dropped down the casing string.

It is a still further object of this invention to provide apparatus for automatically controlling filling of the casing to maintain a predetermined pressure differential while preventing excessive flow rate of fluid into the casing string.

These objects are accomplished in accordance with a preferred embodiment of the invention by providing in a casing string a valve assembly including a flow rate valve element which is selectively converted to a back pressure valve. An upwardly opening differential pressure valve element is seated on a downwardly opening cementing valve. The differential pressure valve opens upwardly when the fluid pressure in the annular space outside the casing string is greater than the pressure in the interior of the casing string. The flow rate valve element and the differential pressure valve are each mounted on a valve stem and the valve stems are rigidly joined together by a frangible link. The flow rate valve element is normally held away from its valve seat by the spring biasing the differential pressure valve against its seat. Thus, opening of the differential pressure valves moves the flow rate valve element toward the valve seat, but normally the flow rate valve remains spaced from the seat to permit flow upwardly when the differential pressure valve opens. By increasing the pump pressure on the fluid in the casing string, the frangible link may be broken. When this occurs, the flow rate valve is no longer biased toward an open position, but is biased toward a closed position and becomes a back pressure valve.

The cementing valve is displaced in a downward direction by fluid pressure in the casing being greater than the pressure in the bore hole. The differential pressure valve element moves with the cementing valve since it is spring biased against the cementing valve. Displacement of the cementing valve uncovers radial ports in the tubular body of the collar or shoe. Fluid which is flowing down the casing string is directed outwardly through the ports into the annular space outside the casing pipe and above the lower end of the pipe. A pin mounted in the tubular body restricts downward displacment of the differential pressure valve element, while the cementing valve continues to move downwardly in response to fluid pressure in the casing string. Thus, cement that is pumped down the casing string flows radially outward through the ports in the side of the tubular body and also downwardly through the orifice in the cementing valve that is no longer covered by the differential pressure valve element. The combination of the radial ports and a bottom outlet provides turbulence to give a better cement bond. The rate of filling the casing can be adjusted by changing the size of the orifice in the center of the cementing valve or the spring bias on the differential pressure valve element.

This preferred embodiment is illustrated in the accompanying drawings in which:

FIG. 3 is a cross sectional view of the apparatus after the frangible link has been broken to convert the safety valve to a back pressure valve; and FIG. 4 is a cross sectional view of the apparatus showing position of the valve elements while cement is being pumped down the casing string.

Figure 1:
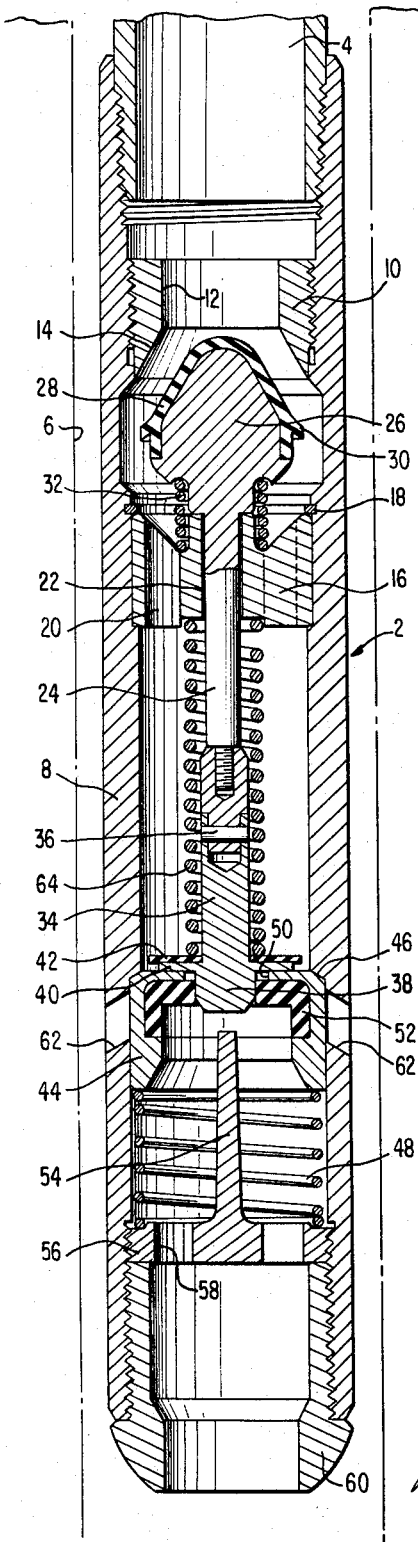
FIG. 1 is a cross sectional view of the apparatus of this invention as mounted in a shoe on the lower end of a casing string.

Referring to FIG. 1, the valve apparatus of this invention is illustrated in the drawings in the form of a shoe 2 mounted on the lower end of a casing string 4. The casing string is suspended in a bore hole 6.

The cementing shoe 2 has a tubular body 8 which is provided with threads at its upper end for being secured to the casing string 4. A tubular collar 10 is mounted in the body 8 adjacent the upper end. The collar 10 has a central passage 12 and a conical portion 14 of the passage forms a valve seat. A valve guide 16 is secured in the tubular body below the collar 10 and is held in place by a snap ring 18. The valve 16 has a plurality of axial ports 20 to permit fluid to flow through the valve guide. A central bore 22 in the valve guide supports a valve stem 24 for axial sliding movement relative to the valve guide. The valve stem 24 has a valve element 26 formed on its upper end. An abrasion resistant, resilient cover 28 is molded on the valve element 26. The cover 28 is preferably formed of rubber and conforms in shape and size to the valve seat 14. A flange 30 extending around the periphery of the cover 28 is pressed tightly against the valve seat 14 by fluid pressure when the valve element 26 engages the valve seat 14. The valve element 26 is urged upwardly toward the valve seat 14 by a spring 32, which is compressed between the valve element and the guide 16.

A second valve stem 34 is secured to the lower end of the valve stem 24 by a pin 36, which rigidly connects the adjacent ends of the valve stems 24 and 34 together. As shown in FIG. 1, the upper end of the stem 34 has an axial bore to receive an axial projection on the stem 34. The pin 36 extends transversely through the stems 24 and 34, so that a downward force on the stem 34 imposes a transverse shearing force on the pin 36. The pin 36 is selected to shear off when a predetermined force is imposed downwardly on the valve stem 34. The lower end of the stem 34 has a valve element 38 including a radial flange 40. A circular disk 42 formed of a flexible resilient material overlies the flange 40 to prevent the leakage of fluid downwardly past the valve element 38.

An orifice valve 44, having a cylindrical side wall and a thin radial top wall, is mounted for axial sliding movement in the tubular body 8. A shoulder 46 in the body 8 forms a valve seat against which the orifice valve 44 is urged by a spring 48. The orifice valve 44 has a central opening 50 through which the valve element 38 extends. A circular rubber gasket 52 in the interior of the valve 44 fits closely around the valve element 38 to prevent the leakage of fluid upwardly past the valve element 38 when the valve is in the position shown in FIG. 1.

Directly below the valve element 38 is a pin 54 which projects upwardly from a mounting ring 56. The ring 56 has a plurality of axial passages 58 to permit the flow of fluid through the ring. A guide 60 is secured on the lower end of the tubular body 8 and a central opening in the guide 60 communicates with the well bore below the shoe 2. Radial ports 62 in the tubular body 8 also communicate with the well bore, but are spaced above the guide 60.

The valve element 38 is urged downwardly by a spring 64 with sufficient force to maintain the flange 40 against the top wall of the orifice valve 44, but the force of the spring 64 is not sufficient to displace the orifice valve 44 away from the valve seat 46 in opposition to the spring 48.

Figure 2:
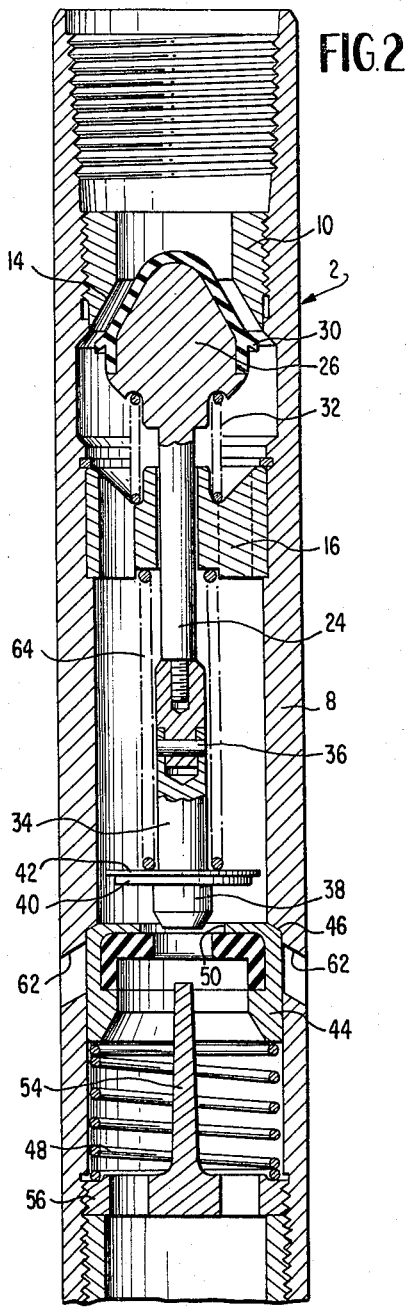
FIG. 2 is a cross sectional view of the shoe during filling of the casing string.

Fluid pressure on the outside of the tubular body 8 is imposed on the valve element 38, since the valve element 38 is in communication with the well bore through the guide 60. When the fluid pressure below the valve element 38 is greater than the pressure above the element 38, the pressure differential urges the valve element upwardly relative to the orifice valve 44, as shown in FIG. 2. Preferably, a pressure differential of between 90 and 100 pounds per square inch between the interior of the casing string and the bore hole is sufficient to displace the valve element 38 upwardly to the position shown in FIG. 2. Since the valve stems 34 and 24 are rigidly connected together, the upper valve element 26 is also displaced toward the valve seat 14, but the valve element 26 does not engage the seat 14 under normal conditions while filling the casing string.

If the rate of fluid flow into the casing string should increase due to an abnormally high pressure differential, the fluid pressure acting on the valve element 38 imposes an axial force urging the element 26 into engagement with the valve seat 14. The radial flange 30 on the element 26 also contributes to shutting off of the flow of fluid into the casing string. The valve element 26 will remain in engagement with the seat 14 until the pressure differential is reduced either by increasing the pressure in the well casing string, or by reducing the fluid pressure in the bore hole.

Circulation may be established at any time during the running of the casing string into the bore hole. By pumping fluid down the pipe, the fluid pressure in the tubular body 8 above the valve element 38 is increased sufficiently to displace the orifice valve 44 downwardly away from the valve seat 46. Downward movement of the valve stem 34 is restricted by the spring 32, since the spring is compressed between the upper valve element 26 and the valve guide 16. Thus, the circulation fluid flows outwardly through the ports 62, and flows downwardly through the orifice 50 provided that the orifice valve 44 is displaced downwardly away from the valve element 38.

The flow control valve element 26 is converted to a back pressure valve by pumping fluid down the pipe at a rapid rate so that the force on the disk 42 and the flange 40 imposed by the fluid pressure above the valve element 38 is sufficiently great to break the shear pin 36 connecting the valve stems 24 and 34. As shown in FIG. 3, when the pin breaks, the valve element 26 is urged upwardly against the valve seat 14 by the spring 32 to allow fluid to flow past the valve 26 only in a downward direction.

During the cementing operation, cement is pumped down the casing string under sufficient pressure to displace the valve element 26 away from the valve seat 14 and to displace the valve element 38 and the orifice valve 44 downwardly. Since the valve element 38 is no longer restricted in its downward movement by the upper spring 32, the flange 40 remains against the top wall of the orifice valve 44 as the valve 44 moves downwardly. When the valve element 38 engages the pin 54, further downward movement of the valve element 38 is prevented, although the orifice valve 44 continues to move downward until it reaches approximately the position shown in FIG. 4. When the valve element 38 and the orifice valve 44 are in these relative positions, cement flowing downwardly through the tubular body 8 passes around the edge of the flange 40 and outwardly through the radial ports 62. A portion of the cement also passes downwardly through the orifice 50 in the valve 44 and out through the guide 60 at the bottom of the tubular body 8. Discharging the cement through ports in the side of the body 8 and at the same time through the bottom guide 60, causes an improved cement bond due to the turbulence produced.

In operation, the cementing shoe 2 is secured on the lower end of the casing string 4. As the casing string is being lowered into the bore hole, the casing remains dry inside until a predetermined pressure differential builds up on opposite sides of the orifice valve 44. When this pressure differential is reached, the valve element 38 is displaced upwardly to permit flow through the orifice 50. When the pressure differential across the valve element 44 drops below the predetermined value, the spring 64 displaces the valve element 38 downwardly to the closed position, as shown in FIG. 1. If the flow of fluid into the casing string through the orifice 50 exceeds a predetermined rate, the dynamic fluid pressure on the flange 40 compresses the spring 64 until the upper valve element 26 engages the valve seat 14. For a two and seven-eighths inch outside diameter pipe, the rate of flow required for moving the valve element 26 into engagement with the seat 14 is about two barrels per minute. The rate of flow required for closing the valve may be adjusted by changing the springs 32 or 64, or by using a different size orifice 50.

To circulate, fluid is pumped down the casing string under sufficient pressure to displace the orifice valve 44 downwardly to the position shown in FIG. 4, thereby allowing the fluid to be discharged outwardly through the ports 62. When the fluid pressure in the casing string is reduced, the spring 48 returns the orifice valve 44 to the position shown in FIG. 1. Normally, the circulation rate is not sufficiently great to break the shear pin 36. A circulation rate of 4 barrels per minute, for example, may be used to shear the pin 36. The valve apparatus is then converted to a float shoe and cementing can be carried out utilizing the valve element 26 as a back pressure valve to prevent the cement in the annual space between the casing and the bore hole from flowing back into the casing string.

When cement is pumped down the casing string after the pin 36 is sheared, the valve element 26 is displaced downwardly by the fluid pressure differential and the valve element 38 and the orifice valve 44 are displaced to the positions in FIG. 4. The cement flows through the orifice 50 and downwardly through the guide 60. A portion of cement also flows outwardly through the ports 62, which add turbulence along the side of the tubular body 8 to provide a better cement bond.

The valve apparatus of this invention maintains a differential pressure between the inside and the outside of the pipe while the casing string is being lowered into the bore hole. This prevents the casing string from overflowing at the top. The valve apparatus also provides a flow rate control to shut off the flow of fluid in the event that the well starts to come in. The valve apparatus permits circulation to be carried out at any time while the casing string is being run in the bore hole. Furthermore, the valve apparatus may be readily converted to a down-jet float shoe. During the cementing operation, the cement is conducted through the side of the shoe and also downwardly through the bottom of the shoe, and the turbulence produced results in an improved cement bond.

The valve apparatus and method of this invention has been described herein as used in carrying out cementing operations, but the invention is not limited to the particular operations described. The apparatus and method may also be used in fracturing or other operations, where it is necessary to pump fluid down the pipe string and to control the rate of fluid flowing into the pipe string.

While this invention has been illustrated and described in one embodiment, it is recognized that variations and changes may be made therein without departing from the invention set forth in the claims.

We claim:

1. Valve apparatus for controlling fluid flow through a pipe string in a well comprising:
    a tubular body adapted for connection in a casing string, means in said body forming a first valve seat,
    a first valve element mounted in said body for movement upwardly relative to said body into engagement with said valve seat, said first valve element shutting off upward flow of fluid when in engagement with said seat, means forming a port bypassing said first valve element,
    a second valve element, means mounting said second valve element for axial movement in said body, spring means biasing said second valve element downwardly into position for closing said bypass port,
    means in said body forming an upper valve seat above said first valve seat, a third valve element mounted in said body for axial movement upwardly into engagement with said upper valve seat, means biasing said third valve element toward said upper valve seat in response to flow upwardly through said body, and
    frangible link means joining together said second and third valve elements, said second valve biasing means normally holding said third element away from said upper valve seat, whereby said second valve element opens said port in response to a predetermined pressure differential on opposite sides of said second valve element, while the third valve element engages said upper seat in response to an upward flow rate greater than a predetermined rate, and said first valve element is displaced from said valve seat by flow of fluid downwardly through said body.

2. The valve apparatus according to claim 1 wherein said third valve element biasing means includes a spring separate from said second element spring biasing means.

3. The valve apparatus according to claim 1 wherein said frangible link is in position for being broken by a predetermined fluid flow rate downwardly through said body.

4. Valve apparatus for controlling fluid flow through a pipe string in a well comprising:
    a tubular body adapted for connection in a casing string, said body having outlet passages extending through the side wall of said body and having an axial opening at the lower end of said body, means in said tubular body forming a valve seat above said outlet passages,
    a first valve element mounted on said body for sliding movement relative to said body upwardly into engagement with said valve seat, said first valve element extending across and closing said outlet passages when in engagement with said valve seat, spring means biasing said first valve element toward said valve seat, said first valve element having an axial port therein,
    a second valve element, means mounting said second valve element in said body for axial movement into position for closing said port, spring means biasing said second valve element downwardly toward said closing position, and
    abutment means in position for limiting downward displacement of said second valve element, whereby fluid pressure above said first valve element displaces said first valve downwardly to open said outlet passages and said abutment means limits displacement of said second valve element to open said port to provide fluid flow through the axial opening at the lower end of the body as well as through the outlet passages.

5. The valve apparatus according to claim 4 wherein said abutment means includes a pin rigidly mounted in said tubular body in alignment with said port whereby said second valve element engages said pin upon downward movement of said first element to limit displacement of said second valve element.

6. The valve apparatus according to claim 4 wherein said first valve element has a radial face around said port, and said second valve element includes a radial flange in position for engaging said radial face adjacent said port, whereby fluid pressure above said first valve element acts on said radial flange and radial face to displace said first valve downwardly while said second valve element remains in closing relation with said port.

7. Valve apparatus for filling and cementing a casing string in a well comprising:
a tubular body adapted for connection at the lower end of a casing string, said body having outlet passages extending through the side wall of said body and having an axial opening at the lower end of said body, means in said tubular body forming a valve seat above said outlet passages,
a first valve element mounted in said body for sliding movement relative to said body upwardly into engagement with said valve seat, said first valve element extending across and closing said outlet passages when in engagement with said valve seat, spring means biasing said first valve element toward said valve seat, said first valve element having an axial port therein,
a second valve element, means mounting said second valve element in said body for axial movement into position for closing said port, spring means biasing said second valve element downwardly toward said closing position,
a third valve element in said body above said first valve element, said body having a valve seat adjacent said third valve element, spring means biasing said third valve element upwardly toward said valve seat,
a valve stem interconnecting said second and third valve elements, said valve stem including a frangible link breakable by a downward force on said second valve element, said third valve element being normally displaced away from its valve seat by said second valve element biasing means prior to breaking said frangible link and being normally in engagement with its valve seat after breaking said frangible link.

8. The valve apparatus according to claim 7 wherein said body includes means forming a valve stem guide, said valve stem being journalled for axial movement in said guide means.

9. The valve apparatus according to claim 8 wherein said second element spring means includes a first spring compressed between said guide means and said second element, and said third element spring means includes a second spring compressed between said guide and said third element.

10. The valve apparatus according to claim 7 wherein said second valve element includes an axial projection extending through said port and a radial flange in position for limiting displacement of said second element downwardly relative to said first element.

11. The valve apparatus according to claim 10 wherein said first valve element has a resilient flexible ring therein in position to engage said second valve element projection in fluid sealing relation.

12. The valve apparatus according to claim 10 wherein said second valve element has a sealing disk overlying said radial flange to prevent fluid flow downwardly between said flange and said first valve element.

References Cited

UNITED STATES PATENTS

| | | | |
|---|---|---|---|
| 2,161,284 | 6/1939 | Crowell | 166—225 X |
| 2,630,178 | 3/1953 | Brown | 166—225 |
| 2,642,140 | 6/1953 | Brown | 166—225 |
| 2,698,054 | 12/1954 | Brown et al. | 166—225 X |
| 2,846,015 | 8/1958 | Pittman | 137—515 X |
| 3,205,955 | 9/1965 | Whittle | 137—515 X |

DAVID H. BROWN, *Primary Examiner.*